(12) United States Patent
Kuriki

(10) Patent No.: US 8,934,355 B2
(45) Date of Patent: Jan. 13, 2015

(54) WIRELESS COMMUNICATION WITH DIVERSITY CONTROL

(75) Inventor: Shoji Kuriki, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 647 days.

(21) Appl. No.: 12/900,756

(22) Filed: Oct. 8, 2010

(65) Prior Publication Data

US 2011/0085459 A1    Apr. 14, 2011

(30) Foreign Application Priority Data

Oct. 9, 2009    (JP) .................................. 2009-234832

(51) Int. Cl.
*H04J 1/16*    (2006.01)
*H04B 7/06*    (2006.01)

(52) U.S. Cl.
CPC ............ *H04B 7/0608* (2013.01); *H04B 7/0689* (2013.01)
USPC ....................................................... 370/252

(58) Field of Classification Search
CPC .................................................... H04B 7/0608
USPC ........... 370/241, 252, 310, 313, 339; 455/101
See application file for complete search history.

(56) References Cited

U.S. PATENT DOCUMENTS

| | | | | |
|---|---|---|---|---|
| 6,032,033 | A * | 2/2000 | Morris et al. ............... | 455/277.2 |
| 6,847,628 | B1 * | 1/2005 | Sakuma ......................... | 370/347 |
| 6,961,545 | B2 * | 11/2005 | Tehrani et al. ................. | 455/101 |
| 7,369,511 | B2 * | 5/2008 | Utsunomiya et al. .......... | 370/252 |
| 7,593,356 | B1 * | 9/2009 | Friday et al. ................... | 370/278 |
| 7,747,789 | B2 * | 6/2010 | Zhou ................................. | 710/8 |
| 8,224,253 | B2 * | 7/2012 | Ofek et al. ..................... | 455/63.4 |
| 2002/0047800 | A1 * | 4/2002 | Proctor et al. ................. | 342/367 |
| 2002/0164963 | A1 * | 11/2002 | Tehrani et al. ................. | 455/101 |
| 2003/0048770 | A1 | 3/2003 | Proctor, Jr. | |
| 2003/0060218 | A1 * | 3/2003 | Billerbeck et al. ............ | 455/501 |
| 2004/0196813 | A1 * | 10/2004 | Ofek et al. ..................... | 370/334 |
| 2004/0196822 | A1 | 10/2004 | Proctor, Jr. | |
| 2005/0186921 | A1 * | 8/2005 | Hoo et al. ....................... | 455/121 |
| 2006/0172711 | A1 | 8/2006 | King et al. | |
| 2007/0223393 | A1 * | 9/2007 | Urushihara et al. ........... | 370/252 |

(Continued)

FOREIGN PATENT DOCUMENTS

| | | |
|---|---|---|
| JP | 8-84104 | 3/1996 |
| JP | 11-298384 | 10/1999 |

(Continued)

OTHER PUBLICATIONS

May 30, 2011 European search report in connection with counterpart European patent application No. 10 25 1761.

(Continued)

*Primary Examiner* — Hassan Kizou
*Assistant Examiner* — Ashil Farahmand
(74) *Attorney, Agent, or Firm* — Cooper & Dunham LLP

(57) ABSTRACT

A wireless communication device stores correspondence information that associates a plurality of operation modes previously selected for communication with a plurality of sender communication devices, with a plurality of identification information items of the sender communication devices. For data transmission to a destination communication device, the wireless communication device selects an operation mode that is previously selected for communication with the destination communication device using the correspondence information.

7 Claims, 9 Drawing Sheets

(56) References Cited

U.S. PATENT DOCUMENTS

| | | | |
|---|---|---|---|
| 2007/0275665 A1* | 11/2007 | Molnar et al. | 455/67.13 |
| 2008/0317107 A1* | 12/2008 | Zhou | 375/222 |
| 2009/0270060 A1 | 10/2009 | Hoo et al. | |
| 2009/0316585 A1* | 12/2009 | Srinivasan et al. | 370/241 |
| 2011/0053493 A1* | 3/2011 | Yanagihara | 455/7 |
| 2011/0222448 A1* | 9/2011 | Ofek et al. | 370/310 |
| 2011/0261763 A1* | 10/2011 | Chun et al. | 370/329 |

FOREIGN PATENT DOCUMENTS

| | | |
|---|---|---|
| JP | 2000-353994 | 12/2000 |
| JP | 2004-7145 | 1/2004 |
| JP | 2007-143090 | 6/2007 |
| JP | 2009-5153 | 1/2009 |
| WO | WO02/082688 A1 | 10/2002 |
| WO | WO03/023895 A2 | 3/2003 |
| WO | WO2007/113923 | 10/2007 |

OTHER PUBLICATIONS

Japanese official action dated Apr. 30, 2013 in corresponding Japanese patent application No. 2009-234832.

* cited by examiner

FIG. 8

| DATA ID | SENDER MAC ADDRESS | SELECTED ANTENNA | NUMBER OF SELECTIONS |
|---|---|---|---|
| 1 | xx:xx:xx:xx:xx:03 | 1 | 32 |
| 2 | xx:xx:xx:xx:xx:0A | 1 | 3 |
| 3 | xx:xx:xx:xx:xx:0A | 2 | 21 |
| 4 | xx:xx:xx:xx:xx:01 | 1 | 8 |
| 5 | xx:xx:xx:xx:xx:01 | 2 | 19 |
| 6 | xx:xx:xx:xx:xx:08 | 1 | 35 |
| ⋮ | ⋮ | ⋮ | ⋮ |

FIG. 10
| DATA ID | SENDER MAC ADDRESS | SELECTED DIRECTION |
|---|---|---|
| 1 | xx:xx:xx:xx:xx:03 | 1 |
| 2 | xx:xx:xx:xx:xx:0A | 2 |
| 3 | xx:xx:xx:xx:xx:01 | 1 |
| 4 | xx:xx:xx:xx:xx:08 | 1 |
| ⋮ | ⋮ | ⋮ |
470a  470b  470c
FIG. 11A
PRIOR ART
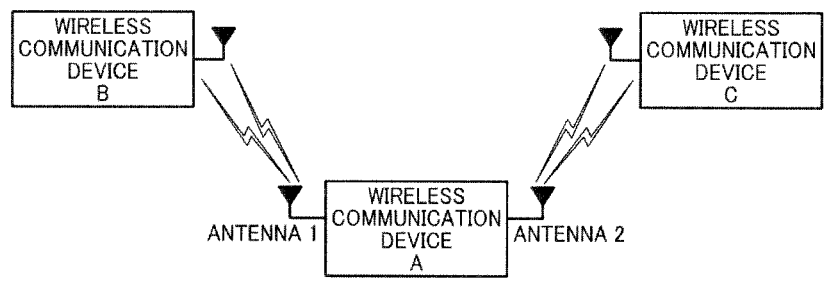
FIG. 11B
PRIOR ART
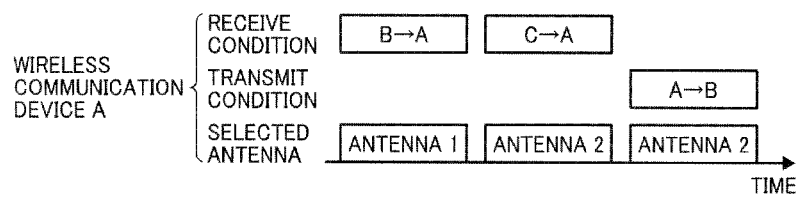

WIRELESS COMMUNICATION WITH DIVERSITY CONTROL

CROSS-REFERENCE TO RELATED APPLICATIONS

This patent application is based on and claims priority under 35 U.S.C. §119 to Japanese Patent Application No. 2009-234832, filed on Oct. 9, 2009, in the Japanese Patent Office, the entire disclosure of which is hereby incorporated herein by reference.

FIELD OF THE INVENTION

The present invention generally relates to a device, apparatus, system, and method of wireless communication, and more specifically to a device, apparatus, system, and method of wireless communication with diversity control.

BACKGROUND

Recently, various wireless communication technologies have been developed, commercialized, and widely used in homes and offices, such as wireless local area network (LAN) communication based on the Institute of Electric and Electronic Engineers (IEEE) 802.11 standards and wireless personal area network (PAN) based on the wireless universal serial bus (USB) standards.

In order to connect a peripheral device to another device such as a personal computer using wireless PAN, a wireless PAN device such as a wireless board or a wireless card based on USB needs to be implemented. The wireless PAN device is provided with two or more antennas, and selects an antenna for communication that has the highest signal intensity level. This diversity control method used by the wireless PAN device is widely used in the field of portable and wireless communications such as wireless LAN and mobile phone devices. For example, as described in Japanese Patent Application Publication Nos. H08-84104, 2007-143090, and H11-298384, in the diversity control method, one antenna or a directional pattern of antenna is selected for data reception based on information regarding the strength of a received signal. For data transmission, the antenna or the directional pattern that has been previously selected for data reception is usually used.

When there are only two devices that communicate with each other, the antenna or the directional pattern that has been selected for data reception can be used for data transmission because a counterpart device is the same. However, when there are more than two devices on a wireless network, the antenna or the directional pattern that has been previously selected for data reception may not always be the most desirable one for a counterpart device as the counterpart device may change over time.

To illustrate this drawback, an example case in which two of three communication devices A, B, and C communicate with each other at an unfixed time is explained referring to FIGS. 11A and 11B. FIG. 11A illustrates a network configuration of the wireless communication devices A, B, and C. FIG. 11B is a timing chart illustrating communication condition of the wireless communication device A. As illustrated in FIGS. 11A and 11B, the wireless communication device A, which is provided with two antennas 1 and 2, selects one of the antennas 1 and 2 for communication with the wireless communication device B or C.

More specifically, referring to FIG. 11B, at the time of receiving data from the wireless communication device B, the wireless communication device A selects the antenna 1. At the time of receiving data from the wireless communication device C, the wireless communication device A selects the antenna 2. If the wireless communication device A is to transmit data to the wireless communication device B after receiving data from the wireless communication device C, the wireless communication device A continues to use the antenna 1 that has been selected for the wireless communication C, which is not suitable for communication with the wireless communication device B.

SUMMARY

In view of the above, there is a need for a diversity control method that allows selection of an antenna or a directional pattern of antenna that is suitable for a specific counterpart communication device with improved accuracy, even when communication devices communicate with each other at unfixed timings or even when there are more than two communication devices.

Example embodiments of the present invention include a device, apparatus, method, system, computer program and product, each capable of storing correspondence information that associates a plurality of operation modes previously selected for communication with a plurality of sender communication devices, with a plurality of identification information items of the sender communication devices. For data transmission to a destination communication device, an operation mode that is previously selected for communication with the destination communication device is selected using the correspondence information.

In addition to the above-described example embodiments, the present invention may be practiced in various other ways.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 8 is an example data structure of an address-antenna correspondence table stored in the wireless communication device of FIG. 7;

FIG. 10 is an example data structure of an address-antenna correspondence table stored in the wireless communication device of FIG. 9;

FIG. 11A is an illustration of a network configuration of a wireless communication system according to a background technology; and FIG. 11B is an illustration for explaining diversity control in the wireless communication system of FIG. 11A.

Figure 1:
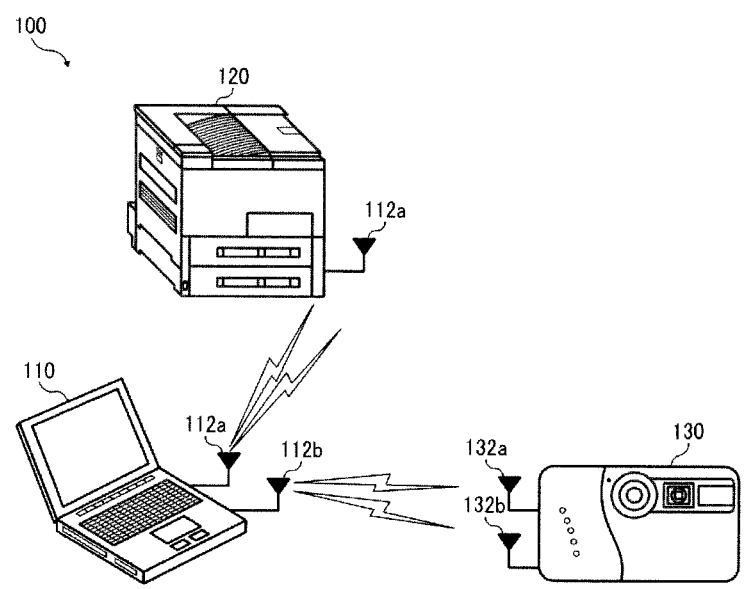
FIG. 1 is an illustration of a network configuration of a wireless communication system, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

FIG. 1 illustrates a network configuration of a wireless communication system 100 according to an example embodiment of the present invention. The wireless communication system 100 of FIG. 1 includes a personal computer (PC) 110 such as a notebook PC, a printer 120, and a digital camera 130, each of which is capable of communicating with one another using a wireless communication protocol such as wireless USB. For the descriptive purpose, the PC 110, the printer 120, and the digital camera 130 are each or collectively referred to as a wireless communication device. In this example, the wireless communication protocol includes any desired protocol that is based on wireless USB. For example, the wireless USB based on Ultra Wideband (UWB) proposed by WiMedia Alliance may be used. Since UWB can be used at low energy levels while allowing high-speed communication in comparison with IEEE802.11a/b/g, UWB is expected to be implemented in various products to improve work efficiency at offices or improve usability at homes. Alternatively, the wireless communication protocol may include any one of wireless LAN communication protocol based on IEEE802.11, Bluetooth communication protocol based on IEEE802.15.1, and mobile wireless communication protocol for PHS or mobile phone.

In this example, the wireless communication device is provided with at least one antenna that allows the wireless communication device to transmit or receive data by switching an operation mode of the at least one antenna. More specifically, in this example, the PC 110 includes two antennas 112a and 112b, and switches between the antennas 112a and 112b using a diversity control method to transmit data or receive data through selected one of the antennas 112a and 112b. The digital camera 130 includes two antennas 132a and 132b, and switches between the antennas 132a and 132b using a diversity control method to transmit data or receive data through selected one of the antennas 132a and 132b. When more than one antenna is available for one wireless communication device, the wireless communication device switches an operation mode of at least one antenna to select one antenna for communication. In this regards, the operation mode of the antenna indicates which one of a plurality of antennas should be used for communication.

The printer 120 includes a directional antenna 122 having a plurality of directional patterns and capable of electrically changing, or switching, a direction of the directional antenna. The printer 120 transmits or receives data by switching a pattern by diversity control. In case of using a directional antenna having a plurality of directional patterns, the wireless communication device switches an operation mode of the antenna to select a direction for communication. In this regards, the operation mode of the antenna indicates which one of directions should be used for communication.

Figure 2:
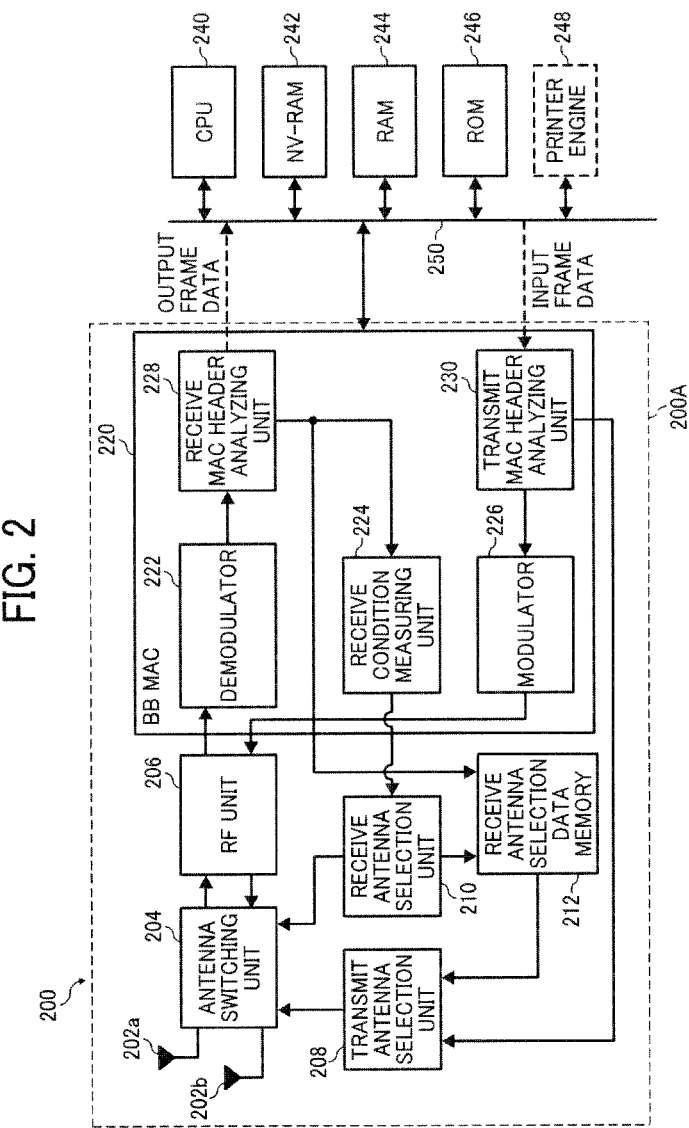
FIG. 2 is a schematic block diagram illustrating a structure of a wireless communication device of the system of FIG. 1, according to an example embodiment of the present invention.

Referring now to FIG. 2, a structure of a wireless communication device 200 is explained according to an example embodiment of the present invention. The wireless communication device 200 of FIG. 2 may be any one of the PC 110 and the digital camera 130 each of which is provided with at least two antennas. The wireless communication device 200 includes a plurality of antennas 202a and 202b, and selects one of the plurality of antennas for data communication. For simplicity, the antennas 202a and 202b may be collectively referred to as the antenna 202. FIG. 2 mainly illustrates a selected section 200A of the wireless communication device 200 that relates to switching or selecting of antennas.

The wireless communication device 200 includes an antenna switching unit 204, a radio frequency (RF) unit 206, a transmit antenna selection unit 208, a receive antenna selection unit 210, and a baseband/media access control unit ("BB MAC") 220. The antenna switching unit 204 switches between the antennas 202a and 202b to select one of the antennas 202a and 202b for data transmission or reception. The RF unit 206, which is connected to the antenna 202 through the antenna switching unit 204, processes high frequency signals.

The BB MAC 220 performs modulation or demodulation of data to be transmitted or received as well as protocol control of a media access control (MAC) layer. The BB MAC 220 is connected to a main functional section of the wireless communication device 200 through a bus 250. For example, the main functional section may include a central processing unit (CPU) 240, a nonvolatile random access memory (NV-RAM) 242, a RAM 244, and a read only memory (ROM) 246. When the wireless communication device 200 is implemented as the printer 120 of FIG. 1, the main functional section additionally includes a printer engine 248. The BB MAC 220 controls input or output of frame data with respect to the main functional section of the wireless communication device 200.

In case of using wireless USB, modulation and demodulation may be carried out using Multi-Band Orthogonal Frequency Division Multiplexing (MB-OFDM) or Direct Spread-Ultra Wide Band (DS-UWB). Alternatively, any desired method may be applied depending on a wireless communication protocol including, for example, Direct Sequence Spread Spectrum (DSSS), Frequency Hopping Spread Spectrum (FHSS), and Packet Binary Convolution Code (PBCC).

More specifically, the BB MAC 220 includes a demodulator 222, a receive MAC header analyzing unit 228, and a receive condition measuring unit 224. The demodulator 222 demodulates RF signals received through the antenna 202. The receive MAC header analyzing unit 228 analyzes a MAC header included in frame data obtained from the modulated RF signals. The receive condition measuring unit 224 measures a condition of the signal, such as the electric waves of the signal, received by the antenna 202 to obtain a measuring result. The receive condition measuring unit 224 sends the measuring result, which is the condition of the signal, such as the electric waves of the signal, received by the antenna 202, to the receive antenna selection unit 210. Based on the measuring unit, the receive antenna selection unit 210 selects one of the antennas 202 that has the most desirable condition of received electric waves of the signal, and causes the antenna switching unit 204 to switch to the selected antenna 202 to be used for data reception.

Once the most desirable antenna is selected by the receive antenna selection unit 210, the receive antenna selection data memory 212 stores therein identification information that uniquely identifies the selected antenna in association with a sender address extracted from the MAC header of the received frame data. This stored information of the receive antenna selection data memory 212 may be referred to by the transmit antenna selection unit 208 when selecting one of the antennas 202 for data transmission.

Further, when the received frame data indicates that a destination address is an address assigned to the wireless communication device 200, the frame data is output to the CPU 240 through the bus 250.

Accordingly, in this example, the receive condition measuring unit 224 has a function of measuring the reception condition of the signal, such as the electric waves of the signal, received through the antenna. The receive MAC header analyzing unit 228 has a function of analyzing receive frame data obtained by demodulating the signals received from the antenna to extract a sender address. The receive antenna selection data memory 212 may be implemented by any desired memory such as a RAM or NV-RAM.

The BB MAC 220 further includes a transmit MAC header analyzing unit 230 and a modulator 226. The transmit MAC header analyzing unit 230 analyzes a MAC header included in the transmit frame data that is input through the bus 250 from the CPU 240. The modulator 226 modulates the transmit frame data to RF signals, and outputs the RF signals through the antenna 202 that is switched by the antenna switching unit 204. The transmit MAC header analyzing unit 230 analyzes the MAC header included in the transmit frame data, extracts the destination address, and sends the destination address to the transmit antenna selection unit 208. The transmit antenna selection unit 208 refers to information stored in the receive antenna selection data memory 212 to read out the identification information identifying the antenna that is selected as the most desirable antenna at the time of receiving data from a device having the destination address that is received from the transmit MAC header analyzing unit 230. Using the read identification information, the transmit antenna selection unit 208 selects one of the antennas 202 that matches the read identification information as an antenna for transmission, and causes the antenna switching unit 204 to switch to the selected antenna. The RF signals converted from the transmit frame data is transmitted through the selected antenna in the form of electric waves. Accordingly, the transmit antenna selection unit 208 selects an antenna that is most desirable for transmission.

Referring now to FIGS. 3 to 6, operation of selecting an antenna for wireless communication is explained according to an example embodiment of the present invention.

Figure 3:
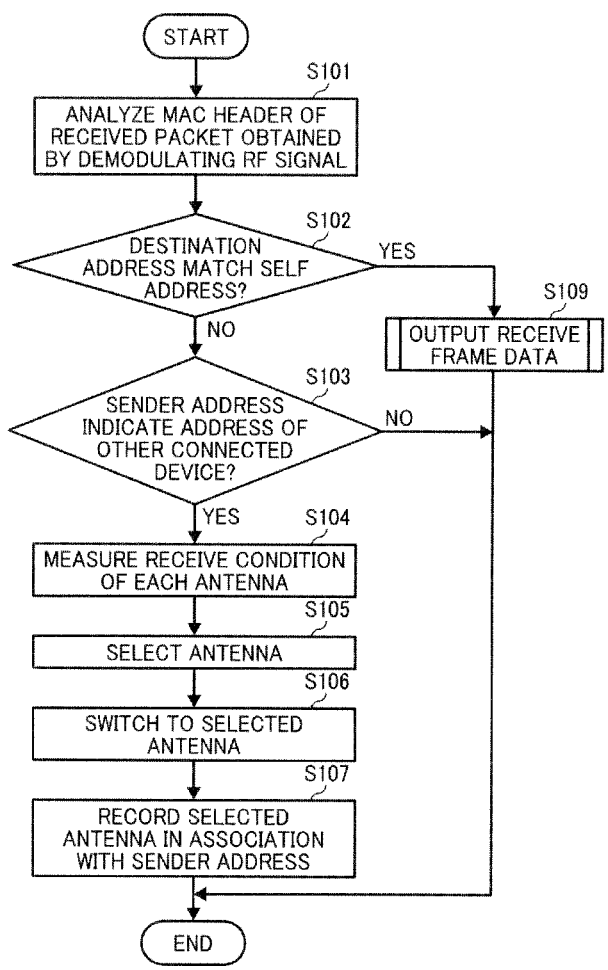
FIG. 3 is a flowchart illustrating operation of selecting an antenna for data reception, performed by the wireless communication device of FIG. 2.

FIG. 3 is a flowchart illustrating operation of selecting an antenna for data reception, performed by the wireless communication device 200 of FIG. 2, according to an example embodiment of the present invention. The operation of FIG. 3 is performed, for example, when the wireless communication device 200 receives an electric signal from another apparatus through the antenna 202.

Figures 4, 5:
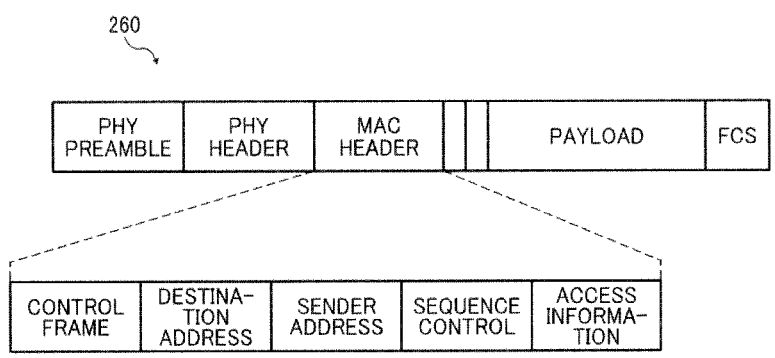
FIG. 4 is an illustration for explaining a format of MAC frame for wireless USB.
FIG. 5 is an example data structure of an address-antenna correspondence table stored in the wireless communication device of FIG. 2.

At S101, the receive MAC header analyzing unit 228 analyzes a MAC header of received frame data that is obtained by demodulating RF signals to extract a sender address of the received frame data. FIG. 4 illustrates a format of frame data based on wireless USB. As illustrated in FIG. 4, the frame data 260, which may be referred to as the MAC frame 260, includes a physical layer (PHY) preamble, a physical (PHY) header, a MAC header, a payload, and a frame check sequence (FCS). The MAC header of the MAC frame 260 includes a destination address specifying an address of destination wireless communication device to which the MAC frame 260 is addressed, and a sender address specifying an address of sender wireless communication device that sends the MAC frame 260. In addition to the destination address and the sender address, the MAC header of the MAC frame 260 may include a control frame, a sequence control, and access information.

Referring back to FIG. 3, at S102, the receive MAC header analyzing unit 228 determines whether the destination address included in the MAC header of the received frame data matches an address assigned to itself. When it is determined that the destination address matches its own address ("YES" at S102), the operation proceeds to S109. When it is determined that the destination address does not match its own address ("NO" at S102), it is determined that the receive frame data is addressed to another station and the operation proceeds to S103.

At S109, the wireless communication device 200 performs processing specified by a body part of the received frame data that follows after the MAC header, without performing any antenna selection. More specifically, the wireless communication device 200 outputs the received data frame to the main functional section, and the operation ends.

At S103, the receive MAC header analyzing unit 228 determines whether any one of wireless communication devices that are currently connected to the wireless communication device 200 has an address that matches the sender address of the received frame data. When it is determined that none of currently connected communication devices has the sender address of the received frame data ("NO" at S103), the operation ends. When it is determined that at least one currently connected communication device has the sender address of the received frame data ("YES" at S103), the operation proceeds to S104.

At S104, the receive condition measuring unit 224 measures the reception condition of the signal, such as the electric waves of the signal, received by each of the antennas 202a and 202b to generate measuring results for the antennas 202a and 202b, and sends the measuring results to the receive antenna selection unit 210. In this example, the wireless communication device 200 performs antenna selection while receiving packet data at the same time. This indicates that the measuring result may vary due to the differences in symbol when the measuring result is generated based on the receive power of the antenna. In order to suppress this variance, the receive condition measuring unit 224 calculates an average value of the receive powers of the received signals that are received by each antenna 202 to obtain a measuring result indicating the electric wave reception condition of each antenna. Alternatively, the receive condition measuring unit 224 may calculate flat characteristics of frequency that corresponds to each antenna to obtain a measuring result indicating the electric wave reception condition of each antenna.

At S105, the receive antenna selection unit 210 selects one antenna that is most desirable in terms of reception condition from the antennas 202, based on the measuring result that indicates the electric wave reception condition of each antenna. In case of measuring the electric wave reception condition of the antenna based on the receive powers of the receive signals of the antenna, or its average value, the receive antenna selection unit 210 selects an antenna having the greatest receive power value, or the greatest receive power average value. In case of measuring the electric wave reception condition of the antenna based on the flat characteristics of frequency, the receive antenna selection unit 210 selects an antenna having the least discrete value of flat characteristics of frequency.

At S106, the antenna switching unit 204 switches a current antenna in use to the selected antenna.

At S107, the receive antenna selection data memory 212 stores identification information of the selected antenna in association with the sender address extracted from the receive frame data, and the operation ends.

FIG. 5 illustrates a data structure of an address-antenna correspondence table 270, which is stored in the receive antenna selection data memory 212. Referring to FIG. 5, the address-antenna correspondence table 270 includes a data ID field 270a, a sender MAC address field 270b, and a selected antenna field 270c. The data ID field 270a stores therein an identification number, such as a sequential number, that is uniquely assigned to each record of information stored in the address-antenna correspondence table 270. The sender MAC address field 270b stores therein a sender MAC address extracted from the received data frame. The selected antenna field 270c stores therein identification information assigned to the selected antenna that is selected as the most desirable antenna at the time of receiving the frame data. Since the wireless communication device 200 is connected to more than one wireless communication device, the address-antenna correspondence table 270 stores a plurality of records of sender address and selected antenna. Further, since the wireless communication device 200 receives data more than once from the same wireless communication device, the record of sender address and selected antenna would be constantly updated.

The operation of FIG. 3 may be performed in various other ways. In the above-described example, when the wireless communication device 200 determines that the destination address of the received frame data matches its own address, the wireless communication device 200 does not perform antenna selection. Alternatively, the wireless communication device 200 may select an antenna that is most appropriate for receiving the frame data addressed to itself, for example, using the preamble signal of the frame data. Further, the operation at S102 may not be performed such that the wireless communication device 200 may be designed to select an antenna no matter whether the destination address matches its own address.

Figure 6:
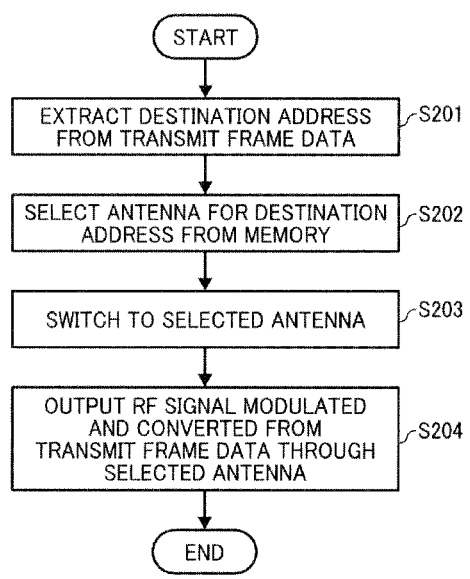
FIG. 6 is a flowchart illustrating operation of selecting an antenna for data transmission, performed by the wireless communication device of FIG. 2.

FIG. 6 is a flowchart illustrating operation of selecting an antenna for data transmission, performed by the wireless communication device 200 of FIG. 2, according to an example embodiment of the present invention. The operation of FIG. 6 is performed, for example, when the wireless communication device 200 receives a transmit data frame input from the main functional section through the bus 250.

At S201, the transmit MAC header analyzing unit 230 analyzes a MAC header of transmit frame data that has been input to extract a destination address from the transmit frame data, and sends the extracted destination address to the transmit antenna selection unit 208.

At S202, the transmit antenna selection unit 208 refers to the address-antenna correspondence table 270 that is stored in the receive antenna selection data memory 212 to read out a record that corresponds to the extracted destination address. Based on the record that is read out, the transmit antenna selection unit 208 specifies identification information of the selected antenna that has been previously selected as the most desirable antenna when frame data is received from a communication device assigned with the extracted destination address, and selects the antenna specified by the identification information as an antenna for data transmission.

For example, referring to FIG. 5, when a destination address that is extracted from transmit frame data is "xx:xx:xx:xx:xx:0A", the transmit antenna selection unit 208 selects the antenna with the identification number "2". This selection is based on assumption that performance of an antenna should be the same for data reception and data transmission. By selecting an antenna that has been selected at the time when data is received from a communication device to which data is to be transmitted, the antenna that is most appropriate for data transmission can be easily selected.

At S203, the antenna switching unit 204 switches a current antenna to the selected antenna, for example, by changing an operation mode of antenna. After S201, the transmit frame data is modulated according to wireless USB standards at the modulator 226, and further converted to RF signals at the RF unit 206.

At S204, the wireless communication device 200 outputs the RF signals through the selected antenna 202, and the operation ends.

As described above, the wireless communication device 200 stores correspondence information that associates identification information specifying an antenna that has been selected at the time when data is received from a specific sender with identification information specifying the specific sender. Using this correspondence information, the wireless communication device 200 selects an antenna that is appropriate for transmitting data to a specific destination. More specifically, the wireless communication device 200 identifies a specific device to which data is to be transmitted, and selects an antenna that has been used for receiving data from the specific device using the correspondence information. With this function, the wireless communication device 200 does not have to repeat the process of selecting an antenna for data transmission as long as there is information regarding an antenna suitable for a specific device. Further, the wireless communication device 200 is able to select an antenna for data transmission with improved accuracy, thus suppressing communication errors and improving communication efficiencies.

The wireless communication device 200 of FIG. 2 may be implemented in various other ways. For example, any desired number of antennas that is equal to or greater than 2 may be provided. Further, in the above-described example, the receive condition measuring unit 224 and the demodulator 222 are separately provided. Alternatively, the receive condition measuring unit 224 may be incorporated within the demodulator 222.

As described above, in this example, the identification information of the selected antenna for a specific sender address, which is stored in the address-antenna correspondence table 270, is updated, or overwritten, every time the wireless communication device 200 receives frame data from the specific sender address. With this updating function, the address-antenna correspondence table 270 is able to always provide updated information that reflects the current reception condition.

However, under some circumstances, this updating function may not be useful especially when transmit or receive condition is not stable. When a network condition is not stable, the intensity of the receive signal tends to fluctuate such that antenna selection may vary every time the signal is received. As selection of antenna tends to vary over time, the antenna that has been selected for the last time of data reception may not be the most appropriate antenna for data transmission. In order to select an antenna that is most desirable for data communication even when a network condition is not stable, the wireless communication device of FIG. 1 may be designed to have a structure different from the structure illustrated in FIG. 2.

Figure 7:
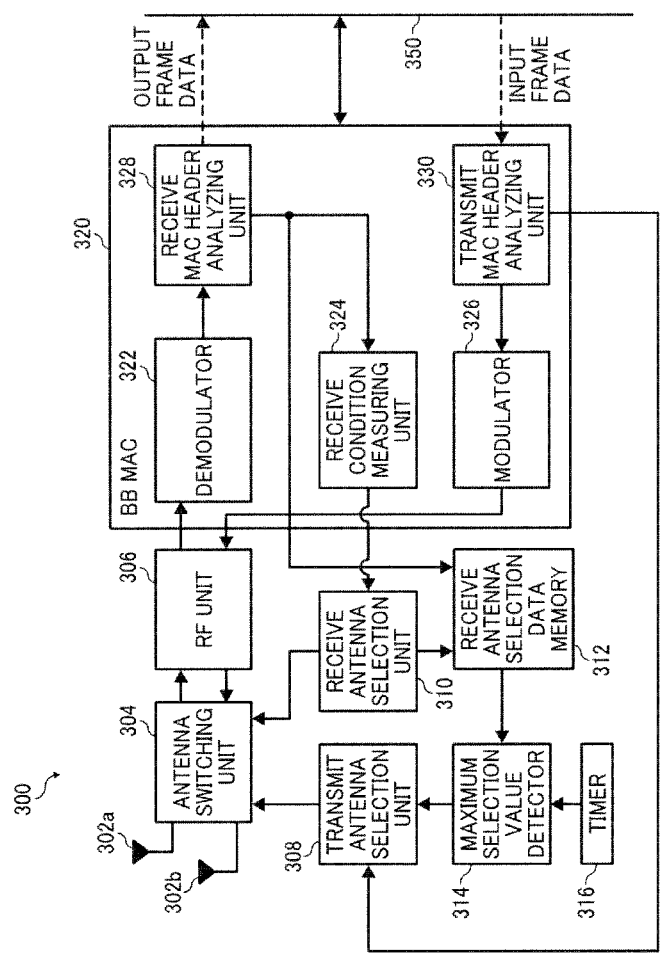
FIG. 7 is a schematic block diagram illustrating a structure of a wireless communication device of the system of FIG. 1, according to an example embodiment of the present invention.

Referring now to FIG. 7, a structure of a wireless communication device 300 is explained according to an example embodiment of the present invention. The wireless communication device 300 is substantially similar in structure to the wireless communication device 200 of FIG. 2, except for addition of a maximum selection value detector 314 and a timer 316. The wireless communication device 300 of FIG. 7 may be any one of the PC 110 and the digital camera 130 each of which is provided with at least two antennas, while one antenna is selected for data transmission or reception.

The wireless communication device 300 includes an antenna switching unit 304, a RF unit 306, a transmit antenna selection unit 308, a receive antenna selection unit 310, a receive antenna selection data memory 312, and a BB MAC 320, which respectively correspond to the antenna switching unit 204, RF unit 206, transmit antenna selection unit 208, receive antenna selection unit 210, receive antenna selection data memory 212, and BB MAC 220 of FIG. 2.

Assuming that frame data is received, the receive antenna selection unit 310 selects one antenna from the antennas 302a and 302b. The identification information specifying the selected antenna is stored in the receive antenna selection data memory 312 in association with a sender address extracted from the frame data. Further, the maximum selection value detector 314 counts a total number of times the selected antenna is selected for the corresponding sender address to obtain a number of selections of the selected antenna with respect to the sender address. The number of selections is stored in the receive antenna selection data memory 312 in association with the sender address and the selected antenna.

FIG. 8 illustrates a data structure of an address-antenna correspondence table 370, which is stored in the receive antenna selection data memory 312. Referring to FIG. 8, the address-antenna correspondence table 370 includes a data ID field 370a, a sender MAC address field 370b, a selected antenna field 370c, and a number of selections field 370d. The data ID field 370a, sender MAC address field 370b, and selected antenna field 370c respectively function in a substantially similar manner as the data ID field 270a, sender MAC address field 270b, and selected antenna field 270c of FIG. 5. The number of selections field 270d stores therein a total number of selections, which is a total number of times a specific antenna is selected for a specific sender MAC address.

Since the wireless communication device 300 is usually connected to a plurality of wireless communication devices, the address-antenna correspondence table 370 stores a plurality of records of the sender address and the selected antenna. Further, as the wireless communication device 300 receives data from the same wireless communication device more than once under different communication conditions, a plurality of different antennas may be selected for one sender address.

For example, transmission or reception characteristics of the wireless communication may change over time due to the change in condition that surrounds the wireless communication devices. In one example, if the wireless communication device 300 or the counterpart wireless communication device is physically moved to a different location, the selected antenna that has been selected before the device is moved is no longer usable as it may not accurately transmit or receive a signal.

In view of the above, the wireless communication device 300 includes the timer 316. The timer 316 initializes at least the number of selections field 370d of the address-antenna correspondence table 317 stored in the receive antenna selection data memory 312 every time a predetermined time period passes. By periodically initializing information stored in the receive antenna selection data memory 312, the wireless communication device 300 is able to select the most desirable antenna that is capable of providing stable communication even when the outside environment has changed. Alternatively, information stored in the receive antenna selection data memory 312 may be initialized at any desired time. For example, information stored in the receive antenna selection data memory 312 may be initialized when a number of selections, which indicates a total number of times a specific antenna is selected for a specific address, reaches a predetermined value.

The maximum selection value detector 314 refers to a plurality of records that have been registered in the address-antenna correspondence table 370 of the receive antenna selection data memory 312 to detect, for each sender address, the greatest value of the number of selections. At the time of transmitting data, when the transmit antenna selection unit 308 receives information specifying the sender address of the transmit frame data from the sender MAC header analyzing unit 330, the transmit antenna selection unit 308 requests the maximum selection value detector 314 to send identification information of the antenna having the greatest value of number of selections for the specified sender address.

In response to the request from the transmit antenna selection unit 308, the maximum selection value detector 314 refers to the address-antenna correspondence table 370 stored in the receive antenna selection data memory 312 to read out identification information of the antenna having the greatest value of number of selections that corresponds to the specified sender address, and send the obtained identification information to the transmit antenna selection unit 308. For example, referring to the address-antenna correspondence table 370 of FIG. 8, when the sender address is "xx:xx:xx:xx:xx:0A", the maximum selection value detector 314 selects the antenna assigned with the identification value "2" as it has the greatest value of number of selections of "21". When the sender address is "xx:xx:xx:xx:xx:08", the maximum selection value detector 314 selects the antenna assigned with the identification value "1" as there is only one antenna that has been stored for the specified sender address.

The transmit antenna selection unit 308, which receives the response from the maximum selection value detector 314, selects the antenna specified by the maximum selection value detector 314, as a transmit antenna to be used for transmitting data, and causes the antenna switching unit 304 to switch a current antenna to the selected antenna. The RF signals of the transmit frame data is transmitted through the switched antenna in the form of electric waves.

As described above referring to FIGS. 7 and 8, in this example, the wireless communication device 300 selects an antenna having the greatest value of number of selections. Accordingly, the wireless communication device 300 is able to select the most desirable antenna that is capable of performing stable communication even when transmission or reception condition is unstable or even when selection of antenna has not been constant.

Further, the wireless communication device 300 may be optionally provided with the timer 316. By having the timer 316, data used for selecting a transmit antenna, such as the correspondence information of sender address and selected antenna, is updated at any desired time such that the wireless communication device 300 is able to select the most desirable antenna even when the communication condition changes over time, for example, due to the change in location of the wireless communication device 300 or the counterpart communication device.

In any one of the wireless communication devices 200 and 300, one antenna is selected from a plurality of antennas for data communication by switching an operation mode of each antenna. In alternative to selecting an antenna for diversity control, the wireless communication device may electrically change a direction of its antenna if the directional antenna is provided.

Figure 9:
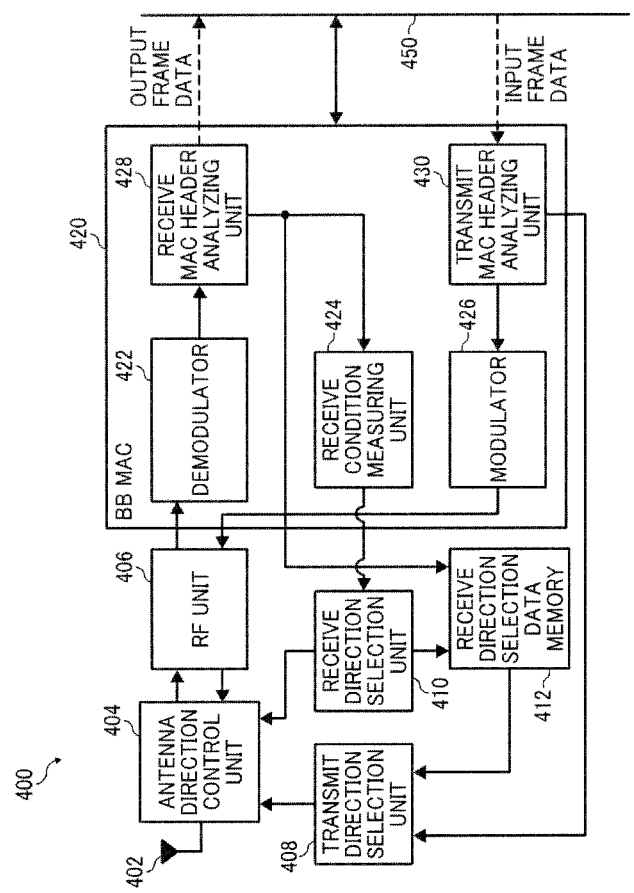
FIG. 9 is a schematic block diagram illustrating a structure of a wireless communication device of the system of FIG. 1, according to an example embodiment of the present invention.

Referring now to FIG. 9, a structure of a wireless communication device 400 is explained according to an example embodiment of the present invention. The wireless communication device 400 of FIG. 9 may be the printer 120 provided with one directional antenna, which changes a directional pattern of the directional antenna for data transmission or reception. The wireless communication device 400 of FIG. 9 is substantially similar in structure to the wireless communication device 200 of FIG. 2, except for replacement of the plurality of antennas 202, antenna switching unit 204, transmit antenna selection unit 208, receive antenna selection unit 210, and receive antenna selection data memory 212, with a directional antenna 402, an antenna direction control unit 404, a transmit direction selection unit 408, a receive direction selection unit 410, and a receive direction selection data memory 412. Further, as described above referring to FIG. 2, the wireless communication device 400 additionally include a main functional section including the CPU, NV-RAM, RAM, and ROM. In this example, when the wireless communication device 400 is implemented as the printer 120, a printer engine 248 is additionally provided in the main functional section.

The directional antenna 402 may be implemented by an electronically steerable parasitic array radiator (ESPER) antenna that is capable of changing a direction by electric control. For example, the direction antenna 402 may have an electrically switchable short-circuited coaxial structure. Alternatively, the directional antenna 402 may be implemented by a plurality of antennas each having a different direction. In such case, one antenna is selected for data communication.

The receive MAC header analyzing unit 428 analyzes a MAC header included in frame data, which is obtained by demodulating RF signals. When the wireless communication device 400 determines that a destination address extracted from the MAC header does not match its own address, but matches an address assigned to another wireless communication device that is currently connected to the wireless communication device 400, directional pattern selection is performed. The receive condition measuring unit 424 measures the reception condition of an electric wave of the directional antenna 402 for each directional pattern to obtain measuring results respectively for a plurality of directions, and sends the measuring results to the receive direction selection unit 410. The receive direction selection unit 410 selects one direction that is most desirable in terms of reception condition from a plurality of directional patterns of the directional antenna 402, based on the measuring results received for the plurality of directional patterns, as a selected direction for data reception. The antenna direction controller unit 404 switches a direction of the directional antenna 404 to the selected direction.

The receive direction selection data memory 412 stores identification information of the selected direction in association with the sender address extracted from the MAC header of the receive frame data. This correspondence information stored in the receive direction selection data memory 412 is referred to by the transmit direction selection unit 408 when selecting a direction of the directional antenna 402 for data transmission. In this example, as described above referring to FIGS. 2 and 3, when the wireless communication device 400 determines that the destination address matches its own address assigned to the wireless communication device 400, the receive frame data is output to a CPU through the bus 450.

FIG. 10 illustrates a data structure of an address-direction correspondence table 470, which is stored in the receive direction selection data memory 412. Referring to FIG. 10, the address-direction correspondence table 470 includes a data ID Field 470a, a sender MAC address field 470b, and a selected direction field 470c. The data ID field 470a stores therein an identification number that is uniquely assigned to each record of information stored in the address-direction correspondence table 470. The sender MAC address field 470b stores therein a sender MAC address extracted from the received data frame. The selected direction field 470c stores therein identification information assigned to the selected direction that is selected as the most desirable direction at the time of receiving the frame data. Since the wireless communication device 400 is connected to more than one wireless communication device, the address-antenna correspondence table 470 stores a plurality of records of sender address and selected direction. Further, since the wireless communication device 400 receives data more than once from the same wireless communication device, the record of sender address and selected direction would be constantly updated.

For data transmission, the sender MAC header analyzing unit 430 analyzes a MAC header of the transmit frame data that is input through the bus 450 to extract a destination address, and sends the extracted destination address to the transmit direction selection unit 408. The transmit direction selection unit 408 refers to the address-direction correspondence table 470 stored in the receive direction selection data memory 412 to read out a record that corresponds to the extracted destination address. Based on the record that is read out, the transmit direction selection unit 408 specifies identification information of the selected direction of the antenna 402 that has been previously selected as the most desirable direction when frame data is received from a communication device assigned with the extracted destination address, and selects the direction specified by the identification information as a direction for data transmission. For example, referring to FIG. 10, when a destination address that is extracted from transmit frame data is "xx:xx:xx:xx:xx:0A", the transmit direction selection unit 408 selects the direction with the identification number "2".

The antenna direction control unit 404 switches a current direction to the selected direction, for example, by changing an operation mode of antenna. The transmit frame data is modulated according to wireless USB standards at the modulator 426, and further converted to RF signals at the RF unit 406 to be transmitted through the antenna 402 having the selected direction in the form of electric waves.

As described above, the wireless communication device 400 stores correspondence information that associates identification information specifying a direction of antenna that has been selected at time when data is received from a specific sender, with identification information specifying the specific sender. Using this correspondence information, the wireless communication device 400 selects a direction that is appropriate for transmitting data to a specific destination. More specifically, the wireless communication device 400 identifies a specific device to which data is to be transmitted, and selects a direction of antenna that has been used for receiving data from the specific device using the correspondence information. With this function, the wireless communication device 400 does not have to repeat the process of selecting a direction for data transmission as long as there is information regarding a direction suitable for a specific device. Further, the wireless communication device 400 is able to select an antenna for data transmission with improved accuracy, thus suppressing communication errors and improving communication efficiencies. Further, with the use of directional antenna, radiation of electric waves is focused on one direction as opposed to radiating various directions. This suppresses the electric waves to interfere with electric waves transmitted by another terminal, thus improving the effective use of electric power for data transmission.

The wireless communication device 400 may be implemented in various other ways. For example, the wireless communication device 400 may be additionally provided with one or more antennas each of which is not capable of electrically changing its direction.

As described above throughout the specification, any one of the above-described wireless communication device is capable of selecting an antenna or a directional pattern of an antenna that is most suitable to communication with a specific counterpart communication device with improved accuracy. For example, even when timing for data transmission and timing for data reception vary between two wireless communication devices or among three or more wireless communication devices, the wireless communication device is able to select an antenna or a directional pattern of an antenna that is most suitable for data communication.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

In one example, any one of the above-described wireless communication devices may be implemented as any desired device other the PC 110, the camera 130, or the printer 120. For example, any one of the above-describe wireless communication devices may be implemented as an image processing apparatus such as a digital copier, a network scanner, a multifunctional apparatus (MFP) capable of performing a plurality of image processing or forming functions of printing, scanning, faxing, etc., an information processing apparatus such as a desktop PC, a photographing apparatus such as a digital camera and a video camera, a personal digital assistant (PDA) device such as a portable phone, a navigation system, etc.

Alternatively, the selected portion of any one of the above-described wireless communication devices illustrated in FIGS. 2, 7, and 9, such as the selected portion 200A, may be implemented as a wireless communication board or a wireless communication card. In such case, the wireless communication device in the form of board or card may be embedded into any other apparatus including an image processing apparatus such as a printer, an information processing apparatus such as a PC, or a photographing apparatus such as a digital camera. Alternatively, the wireless communication device in the form of board or card may be distributed for later use together with any other apparatus.

Further, as described above, any one of the above-described and other methods of the present invention may be embodied in the form of a computer program stored in any kind of storage medium. For example, the computer executable program may be written in any language including a legacy programming language such as assembler, C, C++, C#, Java, etc., or an object oriented programming language. Examples of storage mediums include, but are not limited to, flexible disk, hard disk, optical discs such as CD-ROM, CD-RW, and DVD, magneto-optical discs, magnetic tapes, involatile memory cards, ROM (read-only-memory), EEPROM, EPROM, flash memory, SD cards, etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in a wireless communication device that communicates with a counterpart wireless communication device by switching an operation mode of at least one antenna of the wireless communication device. The counterpart wireless communication device may be a sender device or a destination device. The wireless communication device analyzes receive frame data obtained by demodulating a signal received from the sender device through the at least one antenna to obtain a sender address of the sender device. When the sender address matches an address of any one of counterpart communication devices that are currently connected to the wireless communication device, the wireless communication device measures a reception condition of the signal, such as the electric waves of the signal, of each operation mode of the at least one antenna to obtain measuring results for the operation modes. The wireless communication device selects an operation mode that is most suitable for communication with the sender device based on the measuring results, as a desirable operation mode. The wireless communication device further stores the desirable operation mode in association with the sender address of the sender device to generate correspondence information indicating the correspondence between a plurality of desirable operation modes and a plurality of sender addresses of sender devices. For transmission, the wireless communication device analyzes transmit frame data to be transmitted to a destination device to extract a destination address of the destination device, and selects one of the plurality of operation modes that is stored in association with the destination address using the correspondence information. The selected operation mode is used for transmission of the transmit frame data to the destination device.

In alternative to using the address extracted from frame data, the wireless communication device may use any other information to identify a specific communication apparatus.

In the above-described example, the desirable operation mode that is most desirable for data reception may be an operation mode having the greatest receive power value of received signals, which is determined based on the measuring result. Alternatively, the desirable operation mode may be an operation mode having the least discrete value of flat characteristics of frequency, which is determined based on the measuring result.

In another example, the wireless communication device may further store, for each set of operation mode and sender address, a number of selections indicating a total number of times a specific operation mode is selected as the desirable operation mode for a specific sender address. In such case, the desirable operation mode is an operation mode having the greatest number of selections with respect to the sender address of the sender device.

Further, the number of selections may be initialized at any desired time, for example, periodically or not periodically.

In any one of the above-described examples, the at least one antenna of the wireless communication device includes a plurality of antennas. The operation mode of the at least one antenna is used to identify one of the plurality of antennas to be used for data transmission or reception.

In any one of the above-described examples, the at least one antenna of the wireless communication device includes a directional antenna that is capable of electrically switching among a plurality of directional patterns. The operation mode of the at least one antenna is used to identify one of the plurality of directional patterns of the directional antenna.

In one example, any one of the above-described wireless communication devices may be incorporated into any desired apparatus or system such as an image processing apparatus.

In one example, the present invention may reside in a wireless communication method performed by a wireless communication device. The wireless communication method includes the steps of: analyzing receive frame data obtained by demodulating a signal received from a sender device through at least one antenna of the wireless communication device to obtain a sender address of the sender device; measuring a reception condition of the signal, such as the electric waves of the signal, of the at least one antenna for each of a plurality of operation modes of the at least one antenna to generate measuring results for the plurality of operation modes; selecting one of the operation modes as a desirable operation mode based on the measuring results; storing the desirable operation mode in association with the sender address of the sender device to generate correspondence information indicating the correspondence between a plurality of desirable operation modes of the at least one antenna and a plurality of sender addresses of the sender apparatuses; analyzing transmit frame data to be transmitted to a destination device to extract a destination address of the destination device; and selecting one of the plurality of operation modes that is stored in association with the destination address as an operation mode to be used for transmitting the transmit frame data to the destination device.

The above-described wireless communication method may further include: storing, for each one of the plurality of operation modes, a number of selections indicating a total number of times a specific operation mode is previously selected for a corresponding sender communication device. The selected operation mode is an operation mode having the greatest number of selections for a specific communication device.

In one example, the present invention may reside in a recording medium storing a plurality of instructions which cause a processor to perform any one of the above-described wireless communication methods.

What is claimed is:

1. A wireless communication method performed by a wireless communication device having an antenna unit comprising at least one of (a) a plurality of antennas configured to operate according to a plurality of antenna operation modes each indicating a specified antenna amongst the plurality of antennas that is to be used for communication and (b) an antenna configured to operate according to a plurality of directional patterns and according to a plurality of antenna operation modes each indicating a specified directional pattern amongst the plurality of directional patterns that is to be used for communication, the method comprising:

analyzing receive frame data obtained by demodulating a signal received from a sender communication device through the antenna unit, and extracting an address of the sender communication device from the receive frame data when a destination address included in the receive frame data is addressed to another device other than the wireless communication device;

measuring a reception condition of the signal received through the antenna unit for each of a plurality of sender antenna operation modes of the antenna unit to generate measuring results for the plurality of sender antenna operation modes;

selecting, based on the measuring results reflecting reception conditions one of the plurality of sender antenna operation modes for communication with the sender communication device;

storing an identification of the selected sender antenna operation mode in association with the address of the sender communication device as a destination address when the destination address included in the receive frame data is addressed to said another device other than the wireless communication device;

analyzing transmit frame data to be transmitted to a destination communication device to obtain an identification of the destination communication device;

selecting a destination antenna operation mode based on a sender antenna operation mode that is stored in association with an associated destination address an which matches the identification of the destination communication device;

causing the antenna unit to operate in the selected destination antenna operation mode to communicate with the destination communication device;

counting a total number of times a specific sender antenna operation mode is selected for a specific sender communication device to generate a number of selections of the specific sender antenna operation mode with respect to the specific sender communication device; and storing the number of selections in association with an identification of the respective specific sender antenna operation mode and an identification of the respective specific sender communication device, wherein the destination antenna operation mode is selected based on which sender antenna operation mode has a greatest associated number of selections stored in association with an identification of a sender communication device which matches the identification of the destination communication device.

2. The wireless communication method of claim 1, further comprising:
initializing the number of selections at a predetermined time.

3. A wireless communication device, comprising:
an antenna unit comprising at least one of (a) a plurality of antennas configured to operate according to a plurality of antenna operation modes each indicating a specified antenna amongst the plurality of antennas that is to be used for communication and (b) an antenna configured to operate according to a plurality of directional patterns and according to a plurality of antenna operation modes each indicating a specified directional pattern amongst the plurality of directional patterns that is to be used for communication;
a receive analyzing unit configured to analyze receive frame data obtained by demodulating a signal received from a sender communication device through the antenna unit, and extracting an address of the sender communication device from the receive frame data when a destination address included in the receive frame data is addressed to another device other than the wireless communication device;
a measuring unit configured to measure a reception condition of the signal received through the antenna unit for each of a plurality of sender antenna operation modes of the antenna unit to generate measuring results for the plurality of sender antenna operation modes;
a sender antenna operation mode selection unit configured to select, based on the measuring results reflecting reception conditions, one of the plurality of sender antenna operation modes for communication with the sender communication device;
a storage unit configured to store an identification of the selected sender antenna operation mode in association with the address of the sender communication device as a destination address, when the destination address included in the receive frame data is addressed to said another device other than the wireless communication device;
a transmit data analyzing unit configured to analyze transmit frame data to be transmitted to a destination communication device to obtain an identification of the destination communication device;
a destination antenna operation mode selection unit configured to select a destination antenna operation mode based on a sender operation mode stored by the storage unit in association with an associated destination address which matches the identification of the destination communication device;
an antenna control unit configured to cause the antenna unit to operate in the selected destination antenna operation mode to communicate with the destination communication device;
a counter configured to count a total number of times a specific sender antenna operation mode is selected for a specific sender communication device to generate a number of selections of the specific sender antenna operation mode with respect to the specific sender communication device,
wherein the storage unit is configured to store the number of selections in association with an identification of the respective specific sender antenna operation mode and an identification of the respective specific sender communication device and the destination antenna operation mode selection unit is configured to select a destination antenna operation mode based on which sender antenna operation mode has a greatest associated number of selections stored in association with an identification of a sender communication device which matches the identification of the destination communication device.

4. The wireless communication device of claim 3, further comprising:
means for initializing the number of selections at a predetermined time.

5. The wireless communication device of claim 3, wherein the antenna unit comprises a plurality of antennas, and at least one of the plurality of sender antenna operation modes indicates a specified antenna amongst the plurality of antennas that is to be used for communication with the sender communication device.

6. The wireless communication device of claim 3, wherein the antenna unit comprises a directional antenna configured to operate according to a plurality of directional patterns, and at least one of the plurality of sender antenna operation modes indicates a specified directional pattern amongst the plurality of directional pattern to be used for communication with the sender communication device.

7. A wireless communication system, comprising:
one or more sender communication devices; and
a wireless communication device, comprising:
an antenna unit comprising at least one of (a) a plurality of antennas configured to operate according to a plurality of antenna operation modes each indicating a specified antenna amongst the plurality of antennas that is to be used for communication and (b) an antenna configured to operate according to a plurality of directional patterns and according to a plurality of antenna operation modes each indicating a specified directional pattern amongst the plurality of directional patterns that is to be used for communication;
a receive analyzing unit configured to analyze receive frame data obtained by demodulating a signal received from a sender communication device through the antenna unit, and extracting an address of the sender communication device from the receive frame data when a destination address included in the receive frame data is addressed to another device other than the wireless communication device;
a measuring unit configured to measure a reception condition of the signal received through the antenna unit for each of a plurality of sender antenna operation modes of the antenna unit to generate measuring results for the plurality of sender antenna operation modes;
a sender antenna operation mode selection unit configured to select, based on the measuring results reflecting reception conditions, one of the plurality of sender antenna operation modes for communication with the sender communication device;
a storage unit configured to store an identification of the selected sender antenna operation mode in association with the address of the sender communication device as a destination address, when the destination address included in the receive frame data is addressed to said another device other than the wireless communication device;
a transmit data analyzing unit configured to analyze transmit frame data to be transmitted to a destination communication device to obtain an identification of the destination communication device;

a destination antenna operation mode selection unit configured to select a destination antenna operation mode based on a sender operation mode stored by the storage unit in association with an associated destination address which matches the identification of the destination communication device;

an antenna control unit configured to cause the antenna unit to operate in the selected destination antenna operation mode to communicate with the destination communication device;

a counter configured to count a total number of times a specific sender antenna operation mode is selected for a specific sender communication device to generate a number of selections of the specific sender antenna operation mode with respect to the specific sender communication device, wherein the storage unit is configured to store the number of selections in association with an identification of the respective specific sender antenna operation mode and an identification of the respective specific sender communication device and the destination antenna operation mode selection unit is configured to select a destination antenna operation mode based on which sender antenna operation mode has a greatest associated number of selections stored in association with an identification of a sender communication device which matches the identification of the destination communication device.

* * * * *